US012750399B2

(12) United States Patent
Chesla et al.

(10) Patent No.: US 12,750,399 B2
(45) Date of Patent: Sep. 29, 2026

(54) METHOD AND SYSTEM FOR DETECTION OF ENCRYPTED DISTRIBUTED DENIAL OF SERVICE (DDOS) ATTACKS

(71) Applicant: Radware Ltd., Tel Aviv (IL)

(72) Inventors: Avi Chesla, Tel Aviv (IL); Simcha Stern, Beit Shemesh (IL); Ehud Doron, Moddi'in (IL); Guy Perez, Yavne (IL)

(73) Assignee: Radware, Ltd., Tel Aviv (IL)

( * ) Notice: Subject to any disclaimer, the term of this patent is extended or adjusted under 35 U.S.C. 154(b) by 51 days.

(21) Appl. No.: 18/400,391

(22) Filed: Dec. 29, 2023

(65) Prior Publication Data

US 2025/0220040 A1 Jul. 3, 2025

(51) Int. Cl.
*G06F 21/00* (2013.01)
*H04L 9/40* (2022.01)

(52) U.S. Cl.
CPC ...... *H04L 63/1458* (2013.01); *H04L 63/1425* (2013.01); *H04L 63/166* (2013.01)

(58) Field of Classification Search
CPC ....................... H04L 63/1458; H04L 63/1425; H04L 63/166
See application file for complete search history.

(56) References Cited

U.S. PATENT DOCUMENTS

| | | | | |
|---|---|---|---|---|
| 11,363,044 | B2 | 6/2022 | Doron et al. | |
| 11,405,418 | B2 | 8/2022 | Yarabolu | |
| 11,563,772 | B2 | 1/2023 | Doron et al. | |
| 2013/0254879 | A1* | 9/2013 | Chesla | H04L 63/1425 726/22 |
| 2017/0070531 | A1* | 3/2017 | Huston, III | H04L 63/0428 |
| 2020/0412750 | A1 | 12/2020 | Doron et al. | |
| 2021/0099482 | A1 | 4/2021 | Doron et al. | |
| 2021/0120015 | A1* | 4/2021 | Rajaram | H04L 63/1458 |
| 2021/0152526 | A1* | 5/2021 | Kohout | H04L 41/12 |
| 2021/0194903 | A1 | 6/2021 | Medvedovsky et al. | |
| 2022/0294814 | A1* | 9/2022 | Doron | H04L 63/1425 |

* cited by examiner

*Primary Examiner* — Michael M Lee
(74) *Attorney, Agent, or Firm* — M&B IP Analysts, LLC

(57) ABSTRACT

A method and system for detecting encrypted distributed denial of service (DDoS) attacks are provided. The system includes monitoring encrypted transactions related traffic; deriving from the encrypted transactions rate-based parameters and rate-invariant parameters, wherein the rate-based parameters and rate-invariant parameters are associated with transport layer security (TLS) fingerprints; comparing values of the rate-based parameters and the rate-invariant parameters respectively to at least one rate-based anomaly threshold and at least one rate-invariant anomaly threshold; and declaring a detected encrypted DDoS attack when both the rate-based anomaly threshold and the rate-invariant anomaly threshold are exceeded.

19 Claims, 5 Drawing Sheets

METHOD AND SYSTEM FOR DETECTION OF ENCRYPTED DISTRIBUTED DENIAL OF SERVICE (DDOS) ATTACKS

TECHNICAL FIELD

The present disclosure relates generally to the detection of malicious cyberattacks and, more specifically, to the detection of encrypted TLS DDoS attacks without decryption.

BACKGROUND

Denial of service (DOS) and distributed denial of service (DDoS) attacks are types of cyberattacks where attackers overload a target computer, a network infrastructure, a server, or a system with access requests, to the point where the target computer becomes unable to fulfill its intended purpose.

DOS/DDoS attacks (hereinafter collectively referred to as DDoS attacks) can potentially be performed on the network layer, e.g., using TCP/UDP/Internet Protocol (IP) layer, or on various application layers, e.g., using HTTP/S layer. For example, a common type of DDoS attack, the SYN flood, abuses TCP protocol behaviors, relying on the protocol's established "handshake" routine. In such attacks, the attackers flood the target with requests to synchronize, receiving the target's acknowledgment (ack) and refusing to send the second acknowledgment the target expects, leaving the pattern incomplete, depleting the target resources, and locking out legitimate users.

Transport layer security (TLS) encrypted attacks are quite common nowadays. These attacks can be distributed to hundreds of thousands of targets at a very high request rate, ranging from a few hundred to tens of millions of requests per second and/or a very high rate of TLS handshakes as well as an effective attack vector (even if request rate is low).

Detecting TLS-encrypted attacks can be highly complex because of the specific characteristics of these attacks. One such characteristic is the time it takes to reach the attack rate, which is typically less than 10 seconds and can be a steep climb. Another characteristic is the ratio between the TLS handshake and the number of web requests. This ratio can be either 1-to-1 or 1-to-N. In a 1-to-1 ratio, the TLS handshake rate accurately characterizes the requests' load. In a 1-to-N ratio, multiple requests are generated within the same TCP connection or even within one packet.

Further, modern attack tools have evolved to generate transactions that mimic normal traffic patterns to evade detection and mitigation methods. To achieve this, attackers may comply with the protocols' RFCs, randomize the content of requests, and use web engines that can respond to web challenges. These deceptive techniques make existing DDoS detection and mitigation methods ineffective as they rely on finding consistent attack patterns and/or challenge-response verification methods.

Further, entities like financial services firms, government organizations, and others refrain from sharing their TLS certificates due to privacy reasons. This makes existing detection and mitigation techniques that rely on analyzing the clear text data ineffective.

Accordingly, an efficient method and system for detecting encrypted TLS DDoS attacks are desired.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" or "one aspect" or "some aspects" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include monitoring encrypted transactions related traffic. The method may also include deriving from the encrypted transactions rate-based parameters and rate-invariant parameters, where the rate-based parameters and rate-invariant parameters are associated with transport layer security (TLS) fingerprints. The method may furthermore include comparing values of the rate-based parameters and the rate-invariant parameters respectively to at least one rate-based anomaly threshold and at least one rate-invariant anomaly threshold. Method may in addition include declaring a detected encrypted DDoS attack when both the rate-based anomaly threshold and the rate-invariant anomaly threshold are exceeded. Other embodiments of this aspect include corresponding computer systems, apparatus, and computer programs recorded on one or more computer storage devices, each configured to perform the actions of the methods.

In one general aspect, non-transitory computer-readable medium may include one or more instructions that, when executed by one or more processors of a system, cause the system to: monitor encrypted transactions related traffic; derive from the encrypted transactions rate-based parameters and rate-invariant parameters, where the rate-based parameters and rate-invariant parameters are associated with transport layer security (TLS) fingerprints; compare values of the rate-based parameters and the rate-invariant parameters respectively to at least one rate-based anomaly threshold and at least one rate-invariant anomaly threshold; and declare a detected encrypted DDoS attack when both the rate-based anomaly threshold and the rate-invariant anomaly threshold are exceeded. Other embodiments of this aspect include corresponding computer systems, apparatus, and computer programs recorded on one or more computer storage devices, each configured to perform the actions of the methods.

In one general aspect, a system may include one or more processors configured to: monitor encrypted transactions related traffic. The system may furthermore include derive from the encrypted transactions rate-based parameters and rate-invariant parameters, where the rate-based parameters and rate-invariant parameters are associated with transport layer security (TLS) fingerprints. The system may in addition include comparing values of the rate-based parameters and the rate-invariant parameters respectively to at least one rate-based anomaly threshold and at least one rate-invariant anomaly threshold. System may moreover include declaring a detected encrypted DDoS attack when both the rate-based anomaly threshold and the rate-invariant anomaly threshold are exceeded. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
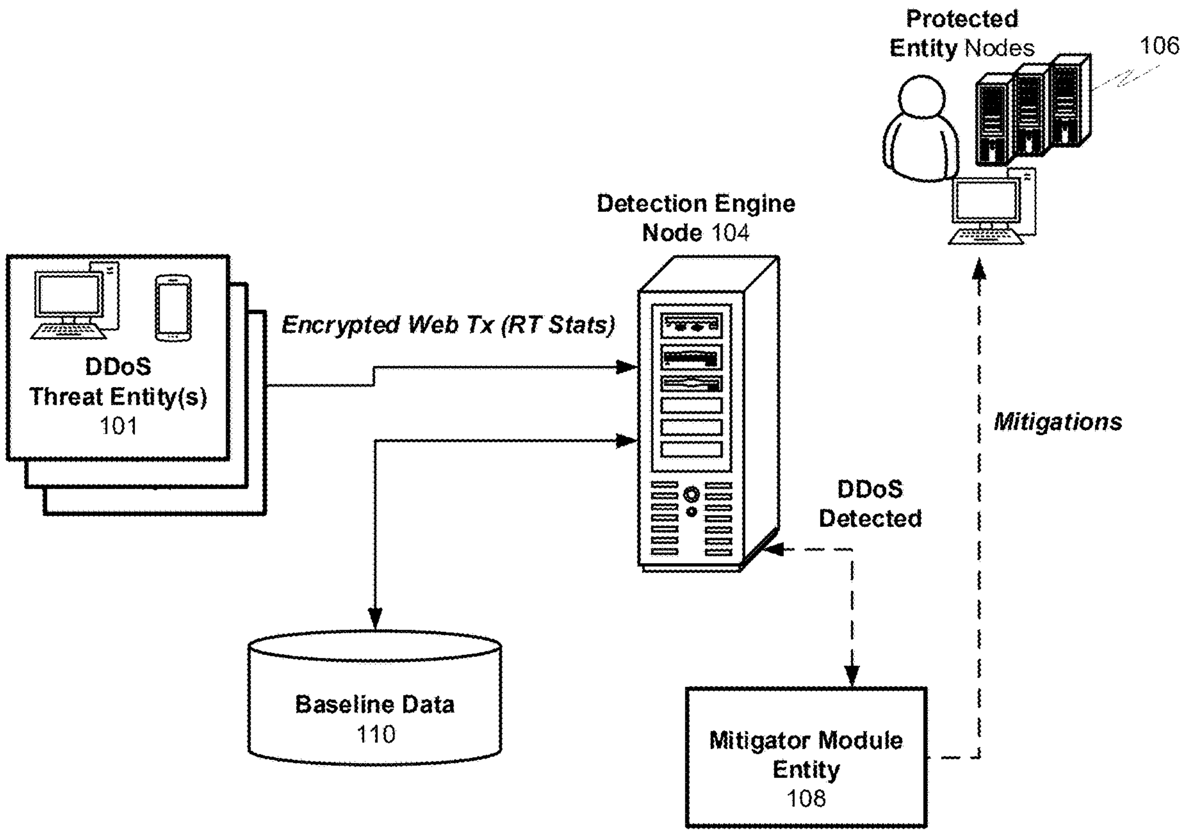
FIG. 1 is a schematic diagram explaining an environment for detecting distributed denial of service (DDoS) attacks represented by encrypted TLS DDoS attacks based on real-time statistics according to an embodiment.

It is important to note that the embodiments disclosed herein are only examples of the many advantageous uses of the innovative teachings. In general, statements made in the specification of the present application do not necessarily limit any of the various claimed embodiments. Moreover, some statements may apply to some inventive features but not others. In general, unless otherwise indicated, singular elements may be in plural and vice versa with no loss of generality. In the drawings, like numerals refer to like parts through several views.

According to the disclosed embodiments, a method and system for detecting encrypted transport layer security (TLS) DDoS attacks based on real-time statistics without decryption, is provided. An encrypted TLS DDoS attack combines two elements: the use of TLS encryption and the malicious intent of a DDoS attack. An encrypted TLS DDoS attack involves launching a DDoS attack against a target while encrypting the malicious traffic using the TLS protocol. This means that the attacker uses TLS encryption to hide the nature and content of the malicious traffic, making it more challenging for security systems to detect and mitigate the attack. An encrypted TLS DDoS attack can exploit any communication protocol utilizing TLS. Such communication protocols may include File Transfer Protocol Secure (FTPs), Simple Mail Transfer Protocol Secure (SMTPs), Hypertext Transfer Protocol Secure (HTTPs), and the like. That is, an encrypted TLS DDoS attack is not limited to web traffic but also targets other servers, services, applications, and the like receiving traffic encrypted using TLS.

In one embodiment, detecting encrypted TLS DDoS attacks is achieved through behavioral analysis. This involves establishing normal baselines for both rate-based and rate-invariant parameters, as well as normal baselines for TLS fingerprints, and detecting any deviations from these baselines that may indicate an encrypted TLS DDoS attack. The normal baselines are based on a normal behavior of the protected entity. The disclosed method provides a technical improvement over current solutions since no TLS certificate is required. Therefore, no decryption is necessary, which results in saving on compute resources, faster detection with fewer false positive alerts, as well as preserving a robust level of data privacy.

In an embodiment, the disclosed system and method mitigate encrypted TLS DDoS attacks using a real-time signature. During a characterization phase, the signature is automatically generated based on TLS fingerprints and parameters derived from the TCP/IP and TLS transportation and session layers or a combination of both.

FIG. 1 is a schematic diagram explaining an environment for detecting encrypted TLS DDoS attacks according to an embodiment.

A detection system 104 is a node, a system, a server, or any other facilitator(s) configured to run the process to detect the encrypted TLS DDoS attacks. The detection system 104 is further configured to learn and update normal baselines for both rate-based and rate-invariant parameters. The encrypted DDoS attacks are detected by analyzing real-time traffic received from client entities 101 directed to protected entities 106 and comparing the analyzed traffic to rate-based and rate-invariant thresholds to identify anomalies in the traffic. The thresholds are computed based on the learned baselines. A detected traffic anomaly may be indicative of an encrypted TLS DDoS attack. In an embodiment, an encrypted TLS DDoS attack is declared when rate-based and rare-invariant anomalies are detected.

The detection system 104 is configured to inspect only ingress traffic from client entities 101 to the protected entities 106. In such a configuration, the system 104 may inspect only incoming requests and effectively detect and mitigate encrypted DDoS attacks.

Client entities 101 can be a WEB browser, or other type of WEB application client or user agent, and the like executing over a computing device, such as a server, a mobile device, an IoT device, a laptop, a PC, a connected device, a smart TV system and the like. A client entity 101 may be a legitimate client device or an attack tool. Such tools carry out malicious TLS DDoS attacks against a victim protected entity 106.

Once the encrypted TLS DDoS is detected, a mitigation system 108 is notified so the mitigation actions may be executed to protect the entities 106. A protected entity 106 may include a server, an application, a service, and the like. In particular, the protected entities 106 may represent a web host implemented on a server cluster that may be local or reside on a cloud.

The mitigation system 108 may perform one or more mitigation actions to mitigate the detected attack. The mitigation system 108 may be, for example, a scrubbing center or a DDoS mitigation device. A mitigation action can be a simple blocking of the request, a response on behalf of the protected entities 106 with a dedicated blocking page, resetting (terminating) the sessions associated with the requests or similar. In yet another embodiment, the mitigation action may include limiting the rate of attacker traffic or merely reporting and logging the mitigation results without any actual blocking of the incoming request. In another embodiment, the mitigation action can issue various types of challenges, e.g., CAPTCHA, to better identify the client as coming from a legitimate user or attack tool operated as a bot. The mitigation action may be activated on a real-time signature of the attack. Such signatures may be generated by the detection system 104 during a characterization phase. Further, the generated signatures can be utilized to update a mitigation policy defined in the mitigation system 108.

According to the disclosed embodiments, the detection system 104 is configured to operate in two states: a learning state and an operational state. In the learning state, both rate-based and rate-invariant baselines are initially learned. The various embodiments for learning such baselines are discussed below. A transition from the learning state into the operational state may be initiated at the end of the preconfigured learning period, or/and when the detection system 104 identifies sufficient learning based, for example, on the volume of the gathered data as well as stability of baselines. In an embodiment, when the baselines are established, detection thresholds are computed.

As will be discussed below, the detection thresholds are computed for rate-based and rate-invariant parameters. It should be noted that both the baselines and thresholds may be continuously updated during the operational state, as long as no anomaly is detected.

According to the disclosed embodiments, real-time statistics on rate-based and rate-invariant parameters are derived from traffic directed to the protected entities 106. It should be noted that such traffic includes transactions or packets encrypted using the TLS protocol. The real-time statistics are compared to the rate-based and rate-invariant thresholds, and when both thresholds are crossed, an attack is detected. The comparison is performed at each time window based on transactions (traffic) received during the time window.

According to the disclosed embodiments, the rate-based and rate-invariant parameters are based on TLS fingerprints. A TLS fingerprint (FP), often referred to as a TLS handshake fingerprint or SSL/TLS fingerprint, is a unique identifier generated from the characteristics of the TLS handshake process between a client and a server during a secure communication session. A FP often represents the TLS library and configuration that the client application uses.

The rate-based parameters may include a FP hits rate, a FP load rate, and the total of FP hits and the total of FP load toward a protected entity. A rate-invariant parameter may include a probability distribution function (PDF) of the FP hits and FP load. That is, a rate-invariant parameter may be the PDF of all FPs derived from encrypted transactions sent to the protected entity. The FP hits rate represents the total number of TLS handshakes per second. The FP load rate represents an estimated number of application requests, or data uploaded, per second. In an example embodiment, the FP load rate is evaluated based on the number of bytes marked with TLS content type 23 (Application Data) associated FP. The total FP hit is the total number of TLS handshakes during a time window toward a protected entity (e.g., a website, FTP site, based on IP address, server name indication (SNI), etc.). The total FP load represents the estimated number of application requests (i.e., transactions rate) or data received during a time window. The various embodiments for learning the baselines and anomaly detection are discussed in detail below.

In some configurations, the detection system 104, the mitigation system 108, and/or the protected entities 106 may be deployed in a cloud computing platform and/or in an on-premises deployment, such that they collocate together, or in a combination. The cloud computing platform may be, but is not limited to, a public cloud, a private cloud, or a hybrid cloud. Examples of cloud computing platforms include Amazon® Web Services (AWS), Cisco® Metacloud, Microsoft® Azure®, Google® Cloud Platform, and the like. In other configurations, the deployment shown in FIG. 1 may include a content delivery network (CDN) connected between client entities 101 and protected entities 106.

It should be noted that although one detection system is depicted in FIG. 1 merely for the sake of simplicity, the embodiments disclosed herein can be applied to a plurality of detection systems protecting multiple geographically distributed entities 106, clients, and servers.

Figure 2:
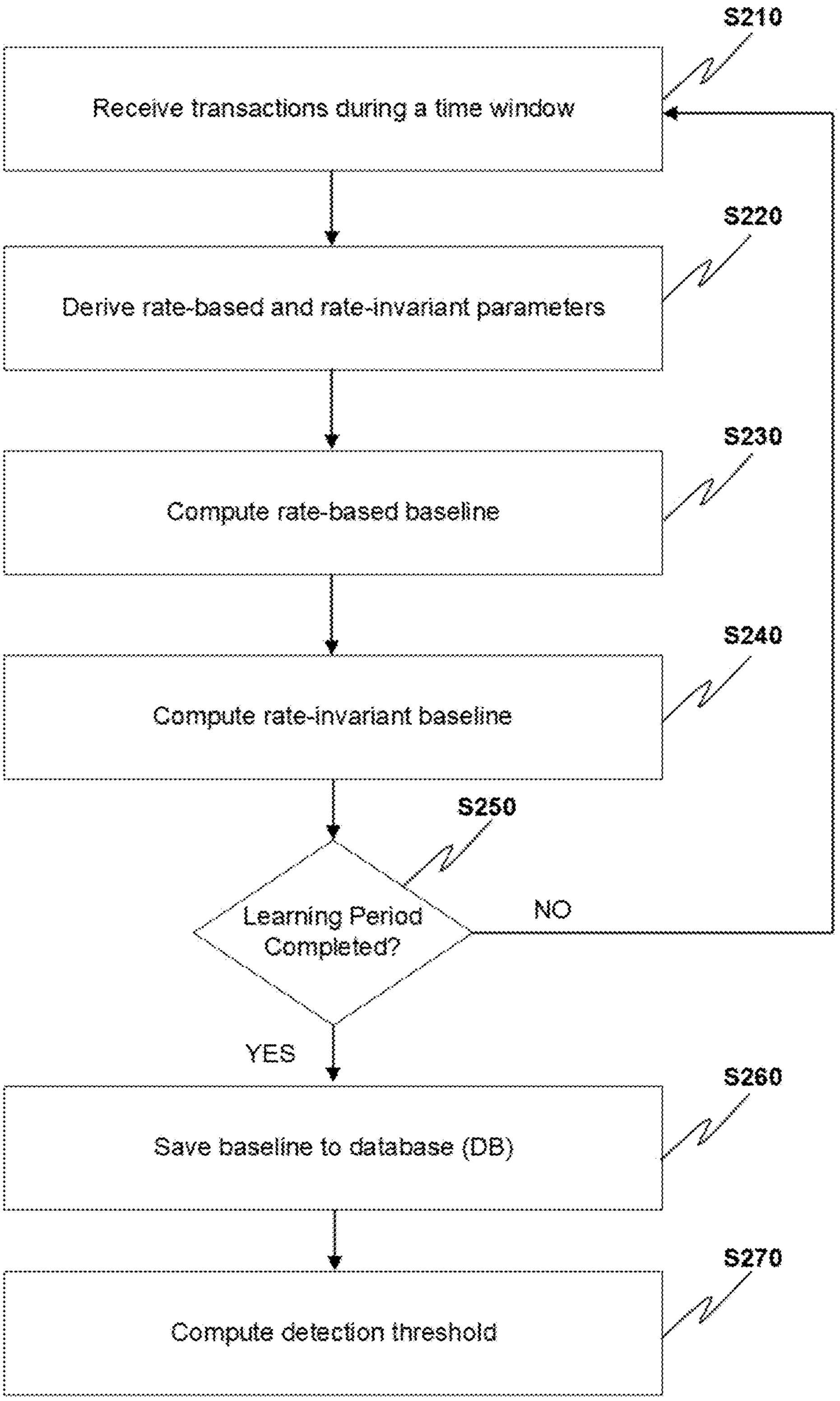
FIG. 2 is an example flowchart of a method for the baseline learning process for detecting encrypted TLS DDoS attacks based on real-time statistics consistent with the disclosed embodiments.

FIG. 2 illustrates an example flowchart of a baselines learning process 200 for detecting encrypted TLS DDoS attacks based on real-time statistics according to the disclosed embodiments.

At S210, transactions are received during a time window. Transactions may include packets, messages, signals, and the like encrypted using TLS. The transactions are sent by a client and targeted to a protected entity. The duration of a time window may be preconfigured, e.g., 10 seconds.

At S220, the process may derive rate-based and rate-invariant parameters from the received transactions. According to some embodiments, the FP hits rate and FP load may be computed at the end of each time window. At the end of each time window [n+1], and per server name indication (SNI), or per server's IP address, etc. the FT hits rate and FP load rate parameters are computed or otherwise derived.

At S230, rate-based baselines are computed. In an embodiment, at S230, the rate-based baselines include mean and var baselines for the FT hits rate and FP load rate parameters. Such baselines may be computed as follows:

$$\text{Hits\_mean}[n+1] = \text{Hits\_mean}[n] \cdot (1-\alpha) + \text{Hits}[n+1] \cdot \alpha$$

$$\text{Hits\_var}[n+1] = \text{Hits\_var}[n] \cdot (1-\alpha) + (\text{Hits}[n+1] - \text{Hits\_mean}[n])2\ \alpha$$

$$\text{Load\_mean}[n+1] = \text{Load\_mean}[n] \cdot (1-\alpha) + \text{Load}[n+1] \cdot \alpha$$

$$\text{Load\_var}[n+1] = \text{Load\_var}[n] \cdot (1-\alpha) + (\text{Load}[n+1] - \text{Load\_mean}[n])2\ \alpha$$

Wherein, the 'a' factor is the alpha coefficient, which defines an IIR filter averaging period. In an embodiment, the 'a' factor is set to select the effective time of the baseline learning. For example, for a short learning α=0.005 (~1 hour), and for a long learning α=0.0008 (~7-8 hours).

In an embodiment, the baseline applied for detection of anomalies is the maximum between the short and long baselines. In an embodiment, the applied baselines include hits mean and load mean, and can be computed as follows:

$$\text{Hits mean} = \max\{(\text{Hits mean})\alpha * \text{short}, (\text{Hits mean})\alpha\text{long}\}$$

$$\text{Load mean} = \max\{(\text{Load mean})\alpha * \text{short}, (\text{Load mean})\alpha\text{long}\}$$

In an embodiment, hits mean and load mean baselines used for detecting anomalies may be refreshed at preconfigured time intervals (e.g., one hour).

At S240, rate-invariant baselines are computed. In an embodiment, baselines are computed as fingerprint distribution function representing a rate-invariant behavioral pattern of all FPs associated with their hits and all FPs associated with their load. That is, the rate-invariant baseline is the PDF of all observed FPs sent toward the protected entity.

The FP distribution allows for the identification of flash-crowd scenarios, as well as identification of new or deviated FPs during an attack, and overall reduction of false positive detection due to unexpected, and legitimate, traffic peaks.

In an embodiment, the rate-invariant baseline is computed as follows:

1. At the beginning of each time window, all existing FPs are copied from a baseline buffer to a time window buffer;
2. A time window buffer is updated with the hits and load counter associated with each known FP. A known FP is defined as a FP value that exists in the final baseline buffer;
3. A new time window buffer is updated with the hits and load counters of unknown FPs. This is performed to protect the buffer's resources against "random" fingerprint attacks;
4. At the end of each time window, a probability distribution function (PDF) for known FPs and unknown FPs are computed. In an example embodiment, for the purpose of anomaly detection, all unknown fingerprints are represented in one bin; and
5. The total variation is computed between the PDFs computed for the known FPs and unknown FPs.

It should be noted that the buffers can be realized as any type of data structure, and the duration of a time window is preconfigured. The baselines are computed and updated during peacetime, i.e., when no attack is detected.

In one embodiment, the probability distribution function (PDF) is computed as follows:

$$PDF_{FP_i} = \frac{li}{\sum_j l_j}$$

where li is the counter value for a specific FP (i). As noted above, the counter is for known and unknown FP hits rate and FP load rate. In an embodiment, at the end of the time window, and in case no attack anomaly is detected, counters are averaged by using an IIR filter with, for example, a 1-hour response (α=0.005). This is performed to protect buffer's resources against "random" fingerprint attacks. In a further embodiment, each counter is assigned an aging factor, i.e., the last update time stamp. Counters with low value and long idle time are removed based on predefined thresholds. The final baselines, used for anomaly detection, are frequently updated e.g., every hour.

In another embodiment, a native FPs baseline is established. Such a baseline demonstrates the behavior of TLS fingerprints analyzed during peacetime and in excess of a certain probability threshold. For example, if a certain PDF baseline includes an FP value that exceeds a value of 0.05, then such an FP is considered a native FP.

The native FPs baseline is utilized, during attack time, to classify the type of attack, whether the attack is based on "unknown" or "known" FPs, or both. Such classification allows evaluating the level of potential false positive that would take place during the attack mitigation. Attack classification or characterization can be used to define mitigation rules and polices. For example, blocking traffic associated with a unique FP.

At S250, the process may check if a learning period is completed. If the learning period is not yet completed at S250, the process returns to S210, where transactions received during a next time window are processed. If the learning period is completed at S250, the process saves the baseline to a database (S260). Then, at S270, the process computes the detection thresholds.

In some embodiments, the computed baselines are saved to a database before the learning period is completed. For example, once the baselines are completed over transactions received during a predefined number of time windows or time period (e.g., an hour), the baselines are updated or saved to the database. This allows refreshing the computed baselines at preconfigured time intervals (e.g., one hour).

It should be noted that the baselines are continuously learned so long as no attack is detected. As such, the detection thresholds are continuously updated.

According to the disclosed embodiments, the detection thresholds, performed at S270, include hits and load rate anomaly thresholds and may be calculated according to predefined deviation factors and the final baselines, as follows:

$$STD = \sqrt{VAR}$$

The hits rate anomaly threshold (rate-based) may be computed as follows:

$$\max\{SF * \text{Hits}_{STD_{mean}} + \text{Hits}_{mean}, (DF+1) * \text{Hits\_mean}\}$$

The load rate anomaly threshold (rate-based) may be computed as follows:

$$\max\{SF * \text{Load}_{STD_{load}} + \text{Load}_{mean}; (DF+1) * \text{Load\_mean}\}$$

where, SF is an STD_Factor and DF represents a Deviation_Factor. Both are customizable parameters.

The rate-invariant anomaly threshold is the value set to a variation metric. Such value can be set based on the required sensitivity of the detection. The sensitivity of the detection may be high, medium, or low.

Although FIG. 2 shows example blocks of a process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 3:
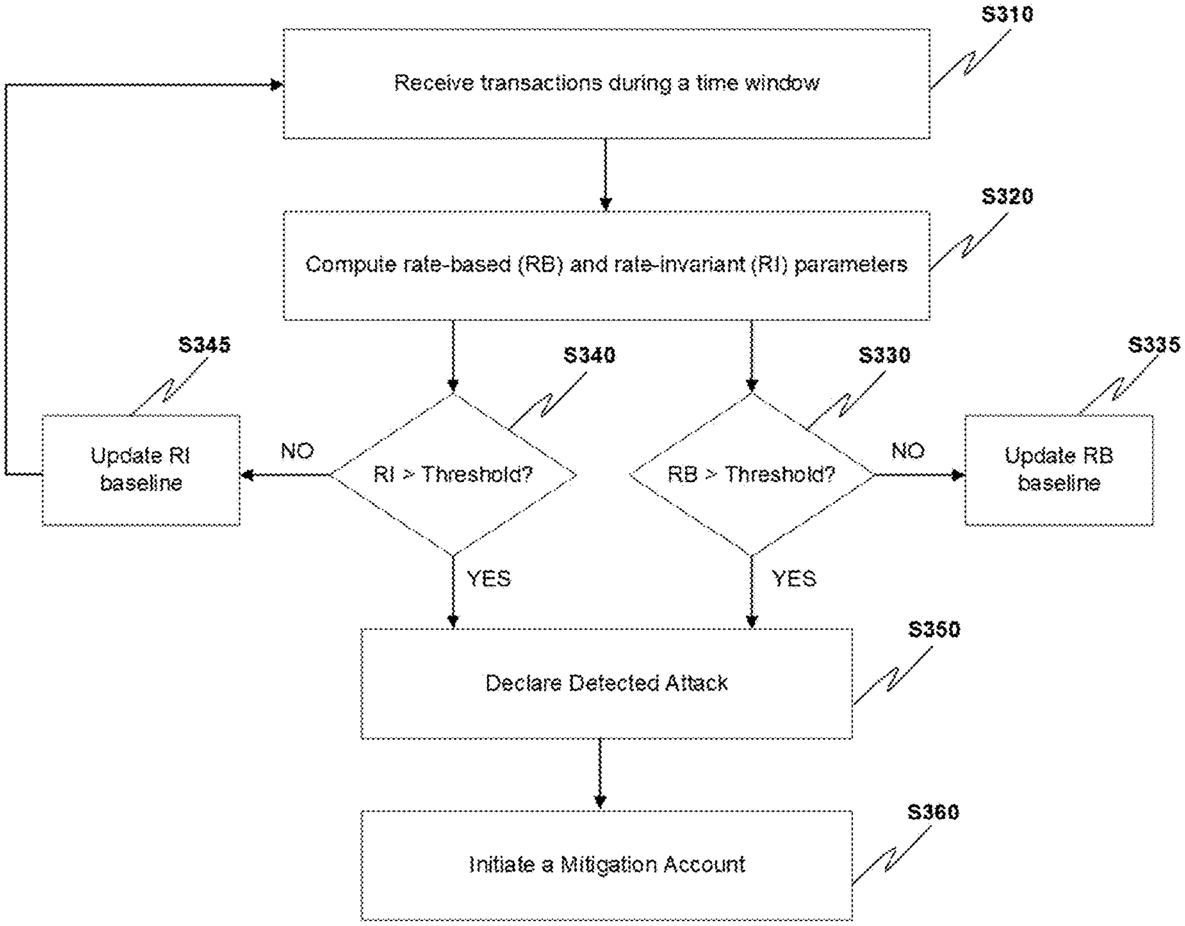
FIG. 3 is an example flowchart of a method for detecting distributed denial of service (DDoS) attacks represented by encrypted TLS DDoS attacks based on real-time statistics consistent with the disclosed embodiments.

FIG. 3 is an example flowchart of a process 300 for detecting encrypted TLS DDoS attacks according to some embodiments. The method may be performed by detection system 104 (see FIG. 1).

At S310, encrypted TLS transactions traffic is monitored or otherwise received. The traffic may be originated by a threat entity (e.g., one of entities 101, FIG. 1) and directed to a protected entity. The encrypted TLS traffic may be represented by the TLS FPs.

At S320, real-time attributes are computed or derived from the encrypted TLS transactions traffic. The extracted real-time attributes may include rate-based (RB) and rate-invariant (RI) parameters.

At S330, the process may compare the rate-based parameters' values to rate-based anomaly thresholds. If, at S330, the rate-based values are below the rate-based anomaly thresholds, the rate-based baselines are updated at S335, and the process returns to S310. If, at S330, the rate-based parameters' values exceed the rate-based anomaly thresholds, the process continues with S350.

At S340, the process may compare the rate-invariant parameters' values to rate-invariant anomaly thresholds. As noted above, a rate-invariant anomaly threshold is set as a value of a variation metric. In an embodiment, the variation metric is computed as follows:

$$\text{Variation Metric} = \sum_{FPi}^{N} |\text{baseline } P \text{Baseline } P_{FP\#i} - \text{Window } P_{FP\#i}|$$

Where a value '0' of the metric represents low variation between the current window PDF's value and baseline PDF's value, there is no anomaly; and where a value '2' represents the largest variation, there is an anomaly. As noted above, the detection threshold can be set between 1 and 2, depending on the detection sensitivity. It should be noted that the variation metric values discussed herein are merely examples.

Figure 4:
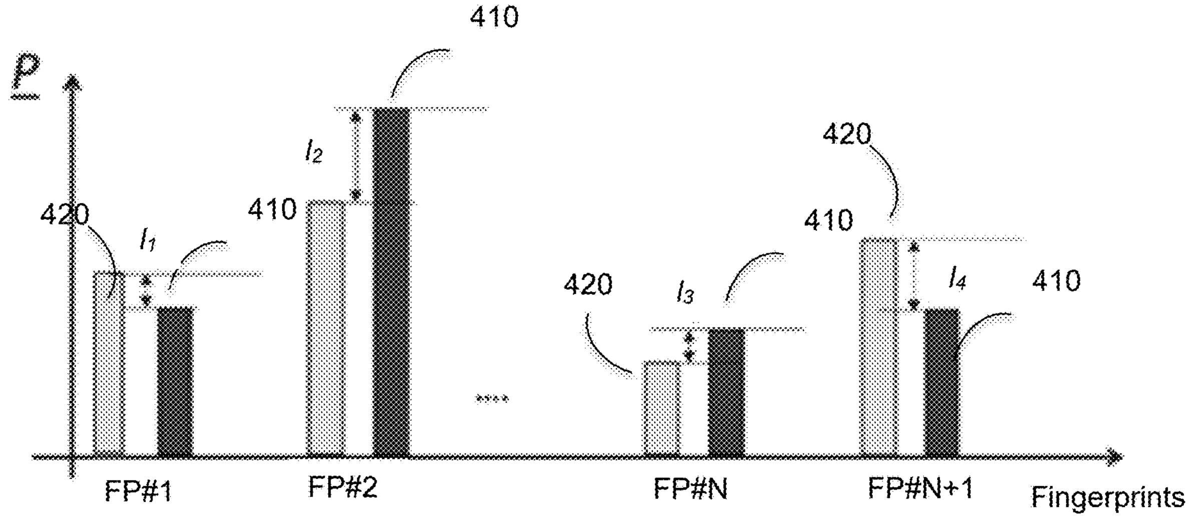
FIG. 4 is a chart showing the PDFs computed for rate-invariant parameters.

FIG. 4 shows an example chart demonstrating the differences between the rate-invariant baseline and a measured rate-invariant parameter at a time window, across all fingerprints (FPs). The bars labeled as '410' are the computed PDF (distributions) for FPs received during a time window (n+1), and the bar labeled as '420' are the computed baseline PDF for FPs for a time window (n). Both bars 410 and 420 are for a rate-invariant parameter. The variation metric is the sum of such differences.

If, at S340, the rate-invariant values are below the rate-invariant anomaly thresholds, the rate-invariant baselines are updated at S345, and the process returns to S310. If, at S340, the rate-invariant parameters' values exceed the rate-invariant anomaly thresholds, execution continues with S350.

At S350, an attack is triggered if both rate-based and rate-invariant parameters breach the anomaly thresholds. In some example embodiments, additional two thresholds may be defined as a minimum attack rate and a maximum attack rate. As long as the rate-based parameter's value is below the minimum rate, an attack will not be triggered but will enter an attack state that stops learning procedures.

In case the rate-based parameter's value is higher than the maximum rate-based anomaly threshold, the system is forced to enter an attack state (i.e., characterization or mitigation), regardless of the value of the rate-invariant parameter.

At S360, a mitigation action is initiated. In some embodiments, S360 may also include characterization of the attack to generate a signature of the attacker. Examples for mitigation actions are discussed above.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 5:
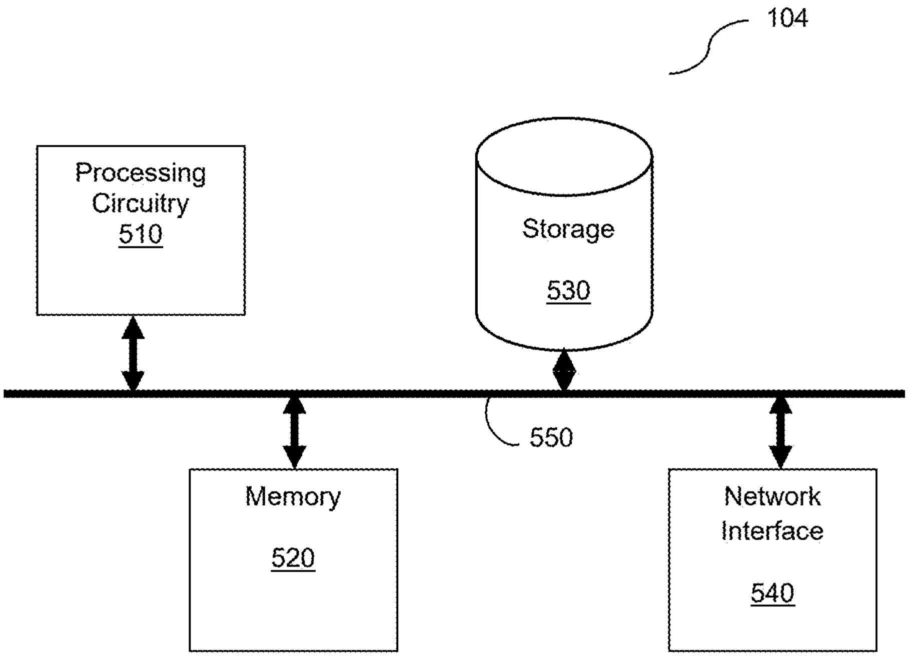
FIG. 5 is a schematic diagram of the hardware layer of a node according to the disclosed embodiments.

FIG. 5 is an example block diagram of a hardware layer depicting a detection system 104, according to an embodiment. The detection system 104 may be a compute node or a network node and includes a processing circuitry 510 coupled to a memory 520, a storage 530, and a network interface 540. In an embodiment, the components of the verification system may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read-only memory, flash memory, etc.), or a combination thereof.

In one configuration, software for implementing one or more embodiments disclosed herein may be stored in storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 540 allows the detection system 104 to communicate with the various components, devices, and systems described herein for production code static analysis, as well as other like purposes. The network interface 540 can be a port of the network node.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to and executed by a machine comprising any suitable architecture. Preferably, the machine is implemented on a computer platform having hardware such as one or more central processing units ("CPUs"), memory, and input/output interfaces. The computer platform may also include an operating system and microinstruction code. The various processes and functions described herein may be either part of the microinstruction code or part of the application program or any combination thereof, which may be executed by a CPU, whether such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting encrypted distributed denial of service (DDoS) attacks comprising:
- monitoring encrypted transactions related traffic;
- deriving from the encrypted transactions rate-based parameters and rate-invariant parameters, wherein the rate-based parameters and rate-invariant parameters are associated with transport layer security (TLS) fingerprints (FPs);
- comparing values of the rate-based parameters and the rate-invariant parameters respectively to at least one rate-based anomaly threshold and at least one rate-invariant anomaly threshold; and
- declaring a detected encrypted DDoS attack when both the at least one rate-based anomaly threshold and the at least one rate-invariant anomaly threshold are exceeded.

2. The method of claim 1, further comprising:
- initiating a mitigation action upon detection of an encrypted DDoS attack.

3. The method of claim 1, wherein a rate-based parameter is any one of: a fingerprint (FP) hits rate, a total FP hits, a FP load rate, and a total FP load towards a protected entity.

4. The method of claim 1, wherein a rate-invariant parameter is any one of: a probability distribution function (PDF) of fingerprint (FP) hits and FP load across a plurality of fingerprints.

5. The method of claim 1, further comprising:
- establishing normal baselines for the rate-based parameters and the rate-invariant parameters based on transaction-related traffic monitored during peacetime.

6. The method of claim 5, wherein establishing the normal baselines for the rate-based parameters further comprises:
- computing means and variance of fingerprint (FP) hits rate and FP load rate, wherein FP hits rate and FP load rate are derived from the monitored encrypted transactions received at peacetime.

7. The method of claim 5, wherein establishing the normal baselines for the rate-invariant parameters further comprises:
- computing a PDF of all FPs associated with encrypted transactions sent towards a protected entity.

8. The method of claim 5, further comprising:
- computing the at least one rate-based anomaly threshold and the at least one rate-invariant anomaly threshold using the established normal baselines.

9. The method of claim 1, wherein comparing values of the rate-invariant parameters to the at least one rate-invariant anomaly threshold further comprises:
- computing a variation metric as a sum of the difference between a rate-invariant baseline and a measured rate-invariant parameter at a time window, across all fingerprints; and
- comparing the computed variation metric to a predefined threshold.

10. A non-transitory computer-readable medium storing a set of instructions for detecting encrypted distributed denial of service (DDoS) attacks, the set of instructions comprising:
- one or more instructions that, when executed by one or more processors of a device, cause the device to:
- monitor encrypted transactions related traffic;
- derive from the encrypted transactions rate-based parameters and rate-invariant parameters, wherein the rate-based parameters and rate-invariant parameters are associated with transport layer security (TLS) fingerprints (FPs);
- compare values of the rate-based parameters and the rate-invariant parameters respectively to at least one rate-based anomaly threshold and at least one rate-invariant anomaly threshold; and
- declare a detected encrypted DDoS attack when both the at least one rate-based anomaly threshold and the at least one rate-invariant anomaly threshold are exceeded.

11. A system for detecting encrypted distributed denial of service (DDoS) attacks comprising:
- one or more processors configured to:
- monitor encrypted transactions related traffic;
- derive from the encrypted transactions rate-based parameters and rate-invariant parameters, wherein the rate-based parameters and rate-invariant parameters are associated with transport layer security (TLS) fingerprints (FPs);
- compare values of the rate-based parameters and the rate-invariant parameters respectively to at least one rate-based anomaly threshold and at least one rate-invariant anomaly threshold; and
- declare a detected encrypted DDoS attack when both the at least one rate-based anomaly threshold and the at least one rate-invariant anomaly threshold are exceeded.

12. The system of claim 11, wherein the one or more processors are further configured to:
- initiate a mitigation action upon detection of an encrypted DDoS attack.

13. The system of claim 11, wherein a rate-based parameter is any one of:
- a fingerprint (FP) hits rate, a total FP hits, a FP load rate, and a total FP load towards a protected entity.

14. The system of claim 11, wherein a rate-invariant parameter is any one of:

a probability distribution function (PDF) of fingerprint (FP) hits and FP load across a plurality of fingerprints.

15. The system of claim 11, wherein the one or more processors are further configured to:

establish normal baselines for the rate-based parameters and the rate-invariant parameters based on transactions-related traffic monitored during peacetime.

16. The system of claim 15, wherein the one or more processors, when establishing the normal baselines for the rate-based parameters, are configured to:

compute means and variance of fingerprint (FP) hits rate and FP load rate, wherein FP hits rate and FP load rate are derived from the monitored encrypted transactions received at peacetime.

17. The system of claim 15, wherein the one or more processors, when establishing the normal baselines for the rate-invariant parameters, are configured to:

compute a PDF of all FPs associated with encrypted transactions sent towards a protected entity.

18. The system of claim 15, wherein the one or more processors are further configured to:

compute the at least one rate-based anomaly threshold and the at least one rate-invariant anomaly threshold using the established normal baselines.

19. The system of claim 11, wherein the one or more processors, when comparing values of the rate-invariant parameters to the at least one rate-invariant anomaly threshold, are configured to:

compute a variation metric as a sum of the difference between a rate-invariant baseline and a measured rate-invariant parameter at a time window, across all fingerprints; and compare the computed variation metric to a predefined threshold.

* * * * *